United States Patent Office 2,768,568

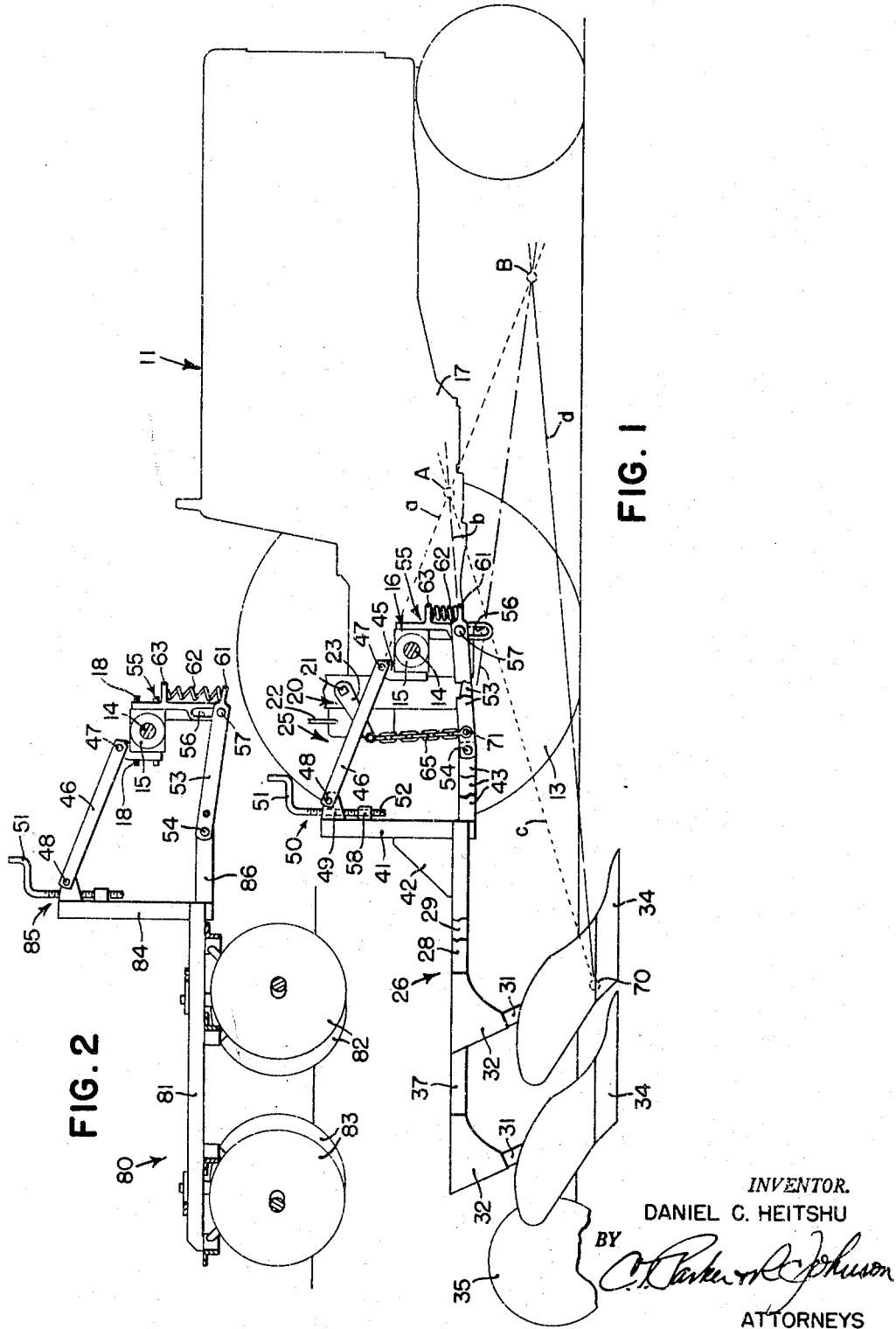

Patented Oct. 30, 1956

2,768,568

HITCH DEVICE FOR TRACTOR-MOUNTED AGRICULTURAL IMPLEMENTS

Daniel C. Heitshu, Moline, Ill., assignor to Deere & Company, Moline, Ill., a corporation of Illinois Application August 10, 1951, Serial No. 241,202

7 Claims. (Cl. 97—46.95)

The present invention relates generally to agricultural machines and more particularly to hitch devices and similar apparatus for connecting a ground-engaging or ground-working implement with the tractor.

The object and general nature of the present invention is the provision of a hitch device adapted to connect a ground-engaging or ground-working implement with the propelling tractor in such a way that the line of draft extending between the tractor and the implement may be varied, as required, so as to provide a level stable running implement. More specifically, it is a feature of this invention to provide a hitch device in the nature of pivoted links extending between the implement and the propelling tractor and arranged in forwardly converging relation, thereby forming what is termed a virtual hitch point, with means for changing certain of the link connections whereby the virtual hitch point is raised in response to a large downward component of soil pressure acting against the implement, which thereby prevents the implement from running too deep. In other words, according to the principles of the present invention, means is provided whereby in the case of ground-working tools, any tendency for the tools to penetrate deeper than the position desired automatically results in a raising of the virtual hitch point, which thus becomes increasingly effective to overcome the tendency of the tools to run too deep. With the above-mentioned converging link type of hitch connection between the implement and the tractor, it is a further feature of the present invention to balance the downward reaction of the implement against resilient means, such as a spring or the like, which, operating in conjunction with suitable means, serves to raise the point of connection between the lower link and the tractor and thereby raise the virtual hitch point and thereby automatically counteracting the increase in downward reaction of the implement.

A further feature of the present invention is the provision of a hitch device of the character above referred to, in which means is provided for changing the position of certain of the pivot points of the forwardly converging links, usually in a vertical direction, so as to provide for raising or lowering the virtual hitch point, and thereby adjust or condition the hitch device to receive any one of a number of different kinds of tools in which, in normal operation, the downward reaction of the soil pressure against the tool or tools in one case may be appreciably greater or appreciably less than the downward reaction of the soil pressure in the case of other tools. It is, therefore, an object of the present invention to produce a hitch device which provides a correct line of draft to secure level and/or stable operation for any one of a number of different tools, which, for example, may have widely different characteristics so far as reaction of soil pressures thereagainst in operation is concerned.

A further feature of this invention is the provision of a hitch arrangement in which what may be considered a virtual hitch point is automatically lowered when the tools are out of the ground and remains in a lowered position, thereby facilitating the entry of the tools into the ground, until the full or normal draft load is exerted, at which time the hitch device then automatically functions to raise the hitch point and maintain the latter in a relatively fixed position with respect to the tractor so long as the full or normal draft load is transmitted.

These and other objects and advantages of the present invention will be apparent to those skilled in the art after a consideration of the following detailed description, taken in conjunction with the accompanying drawings, in which:

Figure 1 is a side view of a tractor and plow outfit in which the principles of the present invention have been incorporated.

Figure 2 is a fragmentary view, showing how the hitch device of the present invention adapts itself to implements other than plows, such as those requiring a low angle line of draft.

Referring now to the drawings, more particularly to Figure 1, the tractor is indicated in its entirety by the reference numeral 11 and includes a pair of closely spaced front wheels and a pair of widely spaced rear traction wheels 13 mounted in axle shafts 14 that are carried in extensions 15 that form a part of a rear axle structure 16. The latter is secured to or forms a part of the frame 17 of the tractor, and the rear tractor axle 16 includes attaching studs 18 or the like that are adapted to receive various implement parts. The tractor 11 is provided with a power operated unit 20, which is of conventional construction so far as the present invention is concerned. The power operated unit 20 constitutes power lift apparatus and includes a power lift part in the form of a transverse rockshaft 21 disosed for movement about a transverse axis at the rear of the tractor, the rockshaft 21 being movable through approximately 60° by hydraulic means which derives operating energy from the engine of the tractor and which is controlled by a valve lever 22. A pair of operating arms 23 is connected to opposite ends of the power lift rockshaft 21.

Referring now more particularly to Figure 1, the hitch device of the present invention is indicated in its entirety by the reference numeral 25 and is shown in Figure 1 as connecting a two-bottom moldboard plow 26 to the tractor 11. The plow 26 is only one of a number of tools that may be connected through the hitch device 25 with the tractor 11. So far as the present invention is concerned, the tool means 26 is of conventional construction, embodying a pair of plow beams 28 and 29 to the rear end of each of which is connected a standard 31 by brackets 32. Secured to the lower end of each of the standards 31 is a conventional plow bottom 34, and connected in any suitable way to the rear end of the beam 29 is a rear furrow wheel 35. The plow beams 28 and 29 are connected together by suitable braces, the rear one of which is shown at 37, and also connected to the plow beams 28 and 29 is an upwardly extending member in the form of a vertical mast 41 that is connected rigidly with the plow beams, as through one or more gusset plates 42. Secured to the lower portions of the mast structure 41 is a pair of laterally spaced apart extensions 43 that, for all intents and purposes, form the forward portions of the plow beams 28 and 29.

Secured to the generally central portion of the rear axle structure 16 of the tractor, or at some other convenient point on the tractor, is a bracket 45 to which the forward end of an upper compression link 46 is pivotally connected, as through pivot means 47 providing for both lateral and vertical swinging movement of the link 46 relative to the tractor. The rear end of the link 46 is connected by similar pivot means 48 to a bracket 49 that is connected for vertical sliding movement with the upper portion of the mast 41. The vertical position of the bracket 49 may be adjusted by depth-adjusting means 50 which includes a crank screw 51, the lower end 52 of which may be anchored to a lug 58 fixed to the mast 41, the upper portion of the threaded part of the crank screw 51 being screwed into a traveling nut (not shown) or the like carried by the slidably mounted bracket 49.

A pair of lower links 53 serve to connect the forward ends of the beam extensions 43 with the tractor. The rear ends of each of the lower links 53 are connected to the extensions 43 through pivot means 54 which may be similar to or identical with the pivot means 47 and 48 referred to above, and the forward ends of the lower links 53 are connected for vertical sliding movement with a pair of draft brackets 55 carried by the tractor. Specifically, each of the draft brackets 55 includes a lower vertically slotted portion 56 in which a pin 57, carried at the forward end of the associated lower link 53, is disposed, the pin 57 being provided with a roller or other friction-reducing means, if desired. The links 46 and 53 are connected with the associated pivots 47, 48, 54 and 57 with conventional ball and socket means, whereby the links may swing laterally as well as vertically. The upper portion of each bracket 55 is connected with the tractor axle structure 16 in any suitable way, as by the tractor attaching studs 18. If desired, the brackets 55 may be formed as integral parts of the tractor rear axle structure. Secured to each of the lower links 53 is a forwardly extending, spring-receiving base 61 on which a compression spring 62 is disposed. The spring-receiving base 61 thus serves as a part adapted to be mounted on the tractor for generally vertical movement relative thereto and to which the associated lower link 53 is connected. Each bracket 55 includes a forwardly extending abutment section 63 against the lower face of which the associated compression spring 62 is disposed. Each of the lift arms 23 is connected with the associated draft link 53 by a chain 65 or the like. The power lift unit 20 of the tractor is of such construction that the lift arms 23 may be disposed in various positions, representing a depth-adjusting range, or the power lift unit may be operated to raise the arms 23 into their fully raised position, representing a transport position for the arms 23 and the implement or tool means associated therewith.

The operation of the tractor and plow outfit as described above is substantially as follows.

In normal plowing the various parts of the hitch device 25, of which the upper and lower links 46 and 53 form the principal portions, occupy the positions shown in Figure 1. As the tractor is advanced the soil resistance acting against the plow bottoms 34 may be considered as concentrated at a center of pressure indicated diagrammatically at 70. The resulting draft of the plow imposes tension stresses on the lower links 53 and compressive stresses on the upper link 46. Due to the suck in the plow bottoms 34, there is a downward component of force which tends to cause the plow 26 to tend to run deeper into the ground, and this downward component acts at the pivot point 54 against the rear ends of the draft links 53, serving to swing the links 53 about a fulcrum 71, at the lower ends of the chains 65, the lift arms 23 being held against downward displacement by the power lift unit 20. This tends to raise the forward ends of the links 53 against the action of the compression springs 62 which, yielding, permit the pin or studs 57 to rise in the slots 56. The links 46 and 53 are thus disposed in forwardly converging relation, axial or longitudinal lines of the links 46 and 53, extended forwardly as indicated at a and b in Figure 1, converging at a virtual hitch point A which, as shown in Figure 1, occupies a relatively high position on the tractor, whereby the line of draft c extending from the effective point of application of the forward propelling force, at A, downwardly and rearwardly to the center of resistance 70, lies at an appreciable angle with reference to the horizontal, whereby there is an upward component of the draft force, the strength of the springs 62 and the associated parts being so chosen that the upward component of the forward pull, exerted along the line of draft c against the plow 26 at 70, is sufficient to balance the downward reaction of the soil pressure against the plow bottoms and the effect of the springs 62. As a result of this construction, such implements as the two-bottom plow 26, which represents tools having a relatively large downward reaction in normal operation, operate in the desired level position and in a stable manner while yet permitting slight variations in the position of the tractor relative to the tool means without causing objectionable changes in the depth of operation. If it should be desired, as to adjust the tool means for various soil conditions, variations in the sharpness of the shares, the suck of the plow bottoms, or the like, to raise or lower the virtual hitch point A to produce a stable operating tool, minor changes in the linkage of the hitch device 25 may be effected by turning the adjusting crank screw 51, which has the effect of raising or lowering the point of connection between the rear ends of the upper link 46 relative to the plow and therefore changing the point of intersection of the lines a and b. Also, if the downward reaction of the tool means 26 should vary, as if the plow should start to operate at too shallow a depth of operation, the springs 62 immediately act to lower the front ends of the links 53 thereby immediately lowering the virtual hitch point, as to a position indicated at B in Figure 1. This has the effect of decreasing the upward component of the forward pull, exerted along the new line of draft d, thus permitting the suck of the plow 34 to draw the tools further into the ground and thereby tending to increase the depth of operation of the plow bottoms and bring them back to the desired position.

As mentioned above, the draft or hitch device 25 of the present invention is adapted to receive tools other than plows or other implements having relatively large downward reaction in operation. For example, as shown in Figure 2, a disk harrow 80 may be connected to the tractor 11 through the hitch device 25. Referring now to Figure 2, the disk harrow 80, which is largely conventional so far as the principles of the present invention are concerned, comprises a main frame 81 to which front and rear gangs 82 and 83 are connected. Secured to the harrow frame 81 so as to form a rigid part thereof is a mast or vertical bracket structure 84. The upper portion of the mast 84 carries a crank screw adjusting means 85 which may be substantially identical with the corresponding structure shown in Figure 1, and secured to the lower portion of the vertical bracket 84 are forward frame extensions 86. The vertically adjustable bracket 85 and the frame extensions 86 are adapted to receive the upper and lower pivot members 48 and 54 described above whereby the upper and lower links 46 and 53 of the draft device 25 of the present invention may be conveniently attached to the harrow 80.

In operation, the disk harrow 80 represents that class of ground-engaging or ground-working tools which do not have any appreciable amount of suck and therefore do not have very much downward reaction in normal operation. Therefore, the springs 62 function to hold the forward ends of the tension links 53 in their lowermost positions, and consequently providing, in effect, a relatively low virtual hitch point, substantially at B, which provides the low angle line of draft d which is inherently necessary to secure proper operation of implements of this type, such as disk harrows. The adjusting unit 85, like the crank screw 51 described above, provides means for making minor adjustments between the rear end of the upper link 46 and the upper portion of the mast or draft bracket 85, serving thereby as means for adjusting the hitch device 25 so as to secure the desired level operation and stable running of the implement or tool means, at whatever the desired depth of operation may be. Thus, the adjusting units 51 and 85 constitute means for adjusting the depth of operation of the associated tool, whether the latter be an implement, such as a plow, requiring a relatively steep line of draft for proper operation, or a tool, such as a disk harrow, requiring a relatively low angle of line of draft for proper operation. The implement or tool means, either the plow 26 or the disk harrow 80, may readily be raised into transport position to be carried by the tractor, by operating the tractor power unit to swing the lift arms 23 into their uppermost or transport positions, thereby swinging the rear ends of the lower tension links 53 vertically and thus raising the implement off the ground. In raising the plow 26, for example, even though the downward component of soil pressure acting against the plow bottoms is reduced by the raising of the plow bottoms, the raising effort, transmitted through the chains 65 to the links 53, raises the front ends of the links 53 to their upper position (full lines, Figure 1), which results in the raising movements of the implement occurring about the virtual hitch point A. This facilitates the plow bottoms running out of the ground. Similarly, when lowering the plow into its operation position, the lowering takes place about the virtual hitch point B which, being low, facilitates the entrance of the plow bottoms into the ground.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

For example, the depth-adjusting units 50 and 85 may, if desired, be interposed between the forward end of the upper or compression link 46 and the tractor, or, as a matter of fact, may be interposed between the rear ends of the lower or tension links 53 and the implement frame or some other convenient part.

Therefore, what I claim and desire to secure by Letters Patent is:

1. A draft device for connecting a ground-working implement to a propelling tractor, said draft device comprising upper and lower generally vertically swingable link means disposed in vertically spaced apart relation, means connecting the rear ends of said link means with the implement in vertically spaced apart relation, means for connecting the forward ends of said link means with the tractor in vertically spaced relation, one of said link connecting means including parts one adapted to be carried by the tractor and the other part connected with the associated link means and shiftable generally vertically relative to said one part, whereby the point of connection of said associated link means with the tractor may be shifted relative to the tractor in a generally vertical direction, resiliently yieldable mechanism connected to act between said relatively shiftable parts to yieldingly oppose relative movement therebetween, and means for pivotally anchoring said associated link means at an intermediate point to the tractor.

2. A draft device for connecting a ground-working implement to a propelling tractor, said draft device comprising upper and lower, generally vertically swingable link means disposed in vertically spaced apart relation and converging forwardly to provide a forward virtual hitch point for said implement, the rear ends of said link means being adapted to be pivotally connected with said implement and the forward end of the upper of said link means being adapted to be pivotally connected with the tractor, generally vertically shiftable means for connecting the forward end of said lower link means with the tractor for generally vertical shifting movement relative thereto, resilient means connected to react upwardly against the tractor and downwardly against said vertically shiftable means for normally holding the forward end of said lower link means in its lower position, thereby providing a relatively low virtual hitch point, and means connected with said lower link means between said generally vertically shiftable means and the rear end of said lower link means, and extending generally upwardly to a point of connection on the tractor for rockably supporting said lower link means on the tractor, whereby upon the occurrence of an increase in the downward component of soil pressure against said implement, the latter acts against the force of said resilient means to raise the forward end of said lower link means, thereby raising said virtual hitch point.

3. A draft device for connecting a ground-working implement to a propelling tractor, said draft device comprising upper and lower, generally vertically swingable link means disposed in vertically spaced apart relation and converging forwardly to provide a forward virtual hitch point for said implement, the rear ends of said link means being adapted to be pivotally connected with said implement and the forward end of the upper of said link means being adapted to be pivotally connected with the tractor, a bracket attachable to the tractor and including a vertically slotted portion, means slidably connecting the forward portion of said lower link means with said slotted portion, resilient means connected to act between said bracket and said lower link means for yieldably resisting upward movement of the latter, means connecting the forward portion of the implement to the rear end of said lower link means, and fulcrum means connected with said lower link means at an intermediate point of the latter whereby downward movement of the implement serves to raise the forward end of said lower link means.

4. For use with a ground-working implement of the type that is adapted to be connected with a tractor by means of upper and lower, generally vertically swingable force-transmitting link means: the improvement comprising a bracket attachable to the tractor, means for shiftably connecting the forward end of said lower link means with said bracket, resilient means connected with said bracket for yieldably opposing movement of the forward end of said lower link means relative to the tractor, and a generally vertically extending member connected at its lower end to said lower link means intermediate the ends of the latter and adapted to be connected at its upper end with said tractor.

5. A draft device for connecting a ground-working implement to a propelling tractor, said draft device comprising upper and lower, generally vertically swingable link means disposed in vertically spaced apart relation and converging forwardly to provide a forward virtual hitch point for said implement, the rear ends of said link means being adapted to be pivotally connected with said implement and the forward end of the upper of said link means being adapted to be pivotally connected with the tractor, means providing a vertically shiftable means to connect the forward end of said lower link means with the tractor, resilient means connected to act between the tractor and said shiftable means for yieldably resisting upward movement of the latter and the forward end of the lower link means, means connecting the forward portion of the implement to the rear end of said lower link means, and fulcrum means connected with said lower link means at a point between the rear end of the lower link means and the vertically shiftable means, whereby downward movement of the implement serves to raise the forward end of said lower link means against the action of said resilient means.

6. For use with a ground-working implement of the type that is adapted to be connected with a tractor by means of upper and lower, generally vertically swingable force-transmitting link means: the improvement comprising a bracket attachable to the tractor, vertically shiftable means connecting the forward end of said lower link means with said bracket, resilient means connected with said bracket for yieldably opposing movement of the vertically shiftable means and the forward end of said lower link means relative to the tractor, and a generally vertically extending member connected at its lower end to said lower link means intermediate the ends of the latter and adapted to be connected at its upper end with said tractor.

7. A draft device for connecting a ground-working implement to a propelling tractor, said draft device comprising upper and lower generally vertically swingable link means disposed in vertically spaced apart relation and converging forward to provide a forward virtual hitch point for said implement, means pivotally connecting the rear ends of said link means with said implement, means for pivotally connecting the forward end of the upper ef said link means with the tractor, means for connecting the forward end of said lower link means with the tractor for generally vertical shifting movement relative thereto, a member connected with said lower link means between its ends and adapted to be connected at its upper end with a tractor for swingably supporting the lower link means from the tractor, and means connected to act between the tractor and one end of said lower link means for yieldably opposing generally vertical movement of said one end of said lower link means in a generally upward direction relative to the tractor.

References Cited in the file of this patent

UNITED STATES PATENTS

| 1,501,652 | Ferguson | July 15, 1924 |
| 2,358,282 | Ray | Sept. 12, 1944 |

FOREIGN PATENTS

| 551,474 | Germany | June 1, 1932 |
| 556,859 | Great Britain | Oct. 26, 1943 |